UNITED STATES PATENT OFFICE.

ARTHUR WEINBERG, OF FRANKFORT-ON-THE-MAIN, GERMANY.

DIAMIDONAPHTHOL.

SPECIFICATION forming part of Letters Patent No. 651,061, dated June 5, 1900.

Application filed January 29, 1900. Serial No. 3,298. (No specimens.)

*To all whom it may concern:*

Be it known that I, ARTHUR WEINBERG, a citizen of Prussia, and a resident of Frankfort-on-the-Main, in the Province of Hesse-Nassau, Kingdom of Prussia, Germany, have invented certain new and useful Improvements in the Production of a new Diamidonaphthol, of which the following is a specification.

If the 2.7.amidonaphtol is combined with diazo bodies in an alkaline solution, the azo group enters into the ortho position to the hydroxyl, and by reduction of the thus-obtained azo dyestuffs a diamidonaphtol of the following constitution is formed:

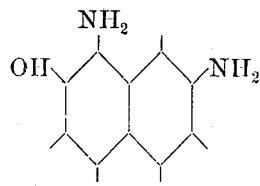

The same diamidonaphtol is obtained in a still more simple way by reducing the substance which results from the action of alkalies on the 2.7.diazonaphtol and which probably corresponds to the formula—

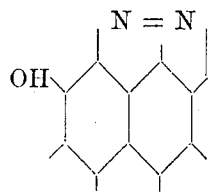

The salts of this new diamidonaphtol possess the valuable property to yield on wool deep-brown dyeings of great intensity and unsurpassed fastness if dyed in a boiling bath with a simultaneous or subsequent addition of bichromates.

The production of the new diamidonaphtol is described in the following examples: 15.9 kilos 2.7.amidonaphtol are dissolved in muriatic acid, and the base is precipitated in a finely-divided state by addition of soda. The diazo combination from 9.3 kilos anilin is then allowed to run into the solution, which is kept alkaline by an excess of soda. The separated dyestuff is filtered off, the paste stirred up with water, twenty kilos iron filings are introduced, the temperature raised to the boil, and muriatic acid is added gradually, while stirring well, taking care that the solution shows always an acid reaction. About one hundred kilos muriatic acid are required. After complete reduction the solution is filtered off from the iron, and the difficultly-soluble sulfate of 1.7.diamido-2-oxynaphtalene is precipitated from the filtrate by addition of sulfate of sodium, or 15.9 kilos 2.7.amidonaphtol are diazotized with 6.9 kilos of nitrite, and the solution is made alkaline by the addition of carbonate of soda. The intramolecular azo compound separates in form of a dark precipitate. It is filtered off and gradually introduced into a solution of tin salt. The thus-produced diamidonaphtol is isolated by means of the sulfate. This salt is rather difficultly soluble in water. It crystallizes in the form of thin nearly-colorless needles. The free base obtained therefrom is rather difficultly soluble in cold, easier soluble in hot, water. It crystallizes in the shape of brilliant leaflets, which melt at 220° centigrade while decomposing.

Having now described my invention and in what manner the same is to be performed, what I claim is—

The new diamidonaphtol having the constitution $NH_2:NH_2:OH=2:8:7$, which crystallizes in the shape of brilliant leaflets, melting at 220° centigrade while decomposing, the chlorhydrate of which is easily soluble, the sulfate more difficultly soluble in cold water, having the property to yield on wool deep-brown dyeings substantially as described.

Signed at Frankfort-on-the-Main, Hesse-Nassau, Prussia, Germany, this 23d day of March, A. D. 1900.

ARTHUR WEINBERG.

Witnesses:
JEAN GRUND,
RICHARD GUENTHER.